US009950957B2

(12) United States Patent
Xu et al.

(10) Patent No.: US 9,950,957 B2
(45) Date of Patent: Apr. 24, 2018

(54) LIGHT WEIGHT GYPSUM FIBER PANEL SUITABLE FOR USE AS ROOF COVER BOARD

(71) Applicant: UNITED STATES GYPSUM COMPANY, Chicago, IL (US)

(72) Inventors: Yufeng Xu, Gurnee, IL (US); Eugene S. Stivender, Yorkville, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 9 days.

(21) Appl. No.: 15/087,539

(22) Filed: Mar. 31, 2016

(65) Prior Publication Data

US 2017/0107152 A1 Apr. 20, 2017

Related U.S. Application Data

(60) Provisional application No. 62/242,388, filed on Oct. 16, 2015.

(51) Int. Cl.

| | |
|---|---|
| ***C04B 28/14*** | (2006.01) |
| ***E04B 2/00*** | (2006.01) |
| ***E04C 2/02*** | (2006.01) |
| ***E04D 11/02*** | (2006.01) |
| ***E04D 5/00*** | (2006.01) |
| ***C04B 26/28*** | (2006.01) |
| ***D21J 1/16*** | (2006.01) |
| ***E04B 7/22*** | (2006.01) |
| ***E04C 2/04*** | (2006.01) |
| ***E04D 1/26*** | (2006.01) |
| ***E04D 3/04*** | (2006.01) |
| *C04B 111/00* | (2006.01) |
| *C04B 111/10* | (2006.01) |

(52) U.S. Cl.

CPC .............. *C04B 28/14* (2013.01); *C04B 26/28* (2013.01); *C04B 28/145* (2013.01); *D21J 1/165* (2013.01); *E04B 7/22* (2013.01); *E04C 2/02* (2013.01); *E04C 2/043* (2013.01); *E04C 2/44* (2013.01); *E04D 1/265* (2013.01); *E04D 3/04* (2013.01); *E04D 5/00* (2013.01); *E04D 11/02* (2013.01); *C04B 2111/0062* (2013.01); *C04B 2111/00586* (2013.01); *C04B 2111/00612* (2013.01); *C04B 2111/1006* (2013.01); *C04B 2111/1018* (2013.01)

(58) Field of Classification Search

CPC ... C04B 2111/0062; C04B 2111/00586; C04B 24/42; C04B 28/145; C04B 28/14; C04B 2111/1018; C04B 26/28; C04B 40/006; C04B 18/24; C04B 30/02; C04B 14/185; E04C 2/043; E04C 5/00; E04D 11/02; E04D 1/265; E04D 3/04; E04D 5/00; Y10S 106/02; Y02W 30/97

See application file for complete search history.

(56) References Cited

U.S. PATENT DOCUMENTS

| | | | | |
|---|---|---|---|---|
| 2,078,199 | A | | 4/1937 | King |
| 3,573,947 | A | | 4/1971 | Kinkade et al. |
| 3,952,830 | A | * | 4/1976 | Oshida .................. C04B 28/001 181/294 |
| 3,988,199 | A | | 10/1976 | Hillmer et al. |
| 4,126,512 | A | | 11/1978 | Hill |
| 4,313,997 | A | | 2/1982 | Ruff et al. |
| 5,256,222 | A | * | 10/1993 | Shepherd ................ B28B 3/123 106/631 |
| 5,320,677 | A | | 6/1994 | Baig |
| 5,539,028 | A | | 7/1996 | Bednar et al. |
| 5,749,954 | A | | 5/1998 | Law et al. |
| 5,911,818 | A | | 6/1999 | Baig |
| 5,964,934 | A | * | 10/1999 | Englert ................. C04B 14/185 106/287.1 |
| 6,017,415 | A | | 1/2000 | Phillips et al. |
| 6,149,831 | A | | 11/2000 | Deporter et al. |
| 6,221,521 | B1 | | 4/2001 | Lynn et al. |
| 6,376,119 | B1 | | 4/2002 | Nann et al. |
| 6,409,825 | B1 | | 6/2002 | Yu et al. |
| 6,712,121 | B2 | | 3/2004 | Clark et al. |
| 7,811,663 | B2 | | 10/2010 | Paradis et al. |
| 8,936,855 | B2 | | 1/2015 | Kimuro et al. |
| 2004/0231916 | A1 | * | 11/2004 | Englert ................... B28B 5/027 181/296 |
| 2007/0207304 | A1 | | 9/2007 | Krick et al. |
| 2009/0173464 | A1 | | 7/2009 | Baig |
| 2012/0285643 | A1 | * | 11/2012 | Yu ............................ E04C 2/16 162/164.4 |

OTHER PUBLICATIONS

Adam A. Brancato, Effect of Progressive Recycling on Cellulose Fiber Surface Properties, Georgia Institute of Technology, Dec. 2008.

Gerard J. F. Ring et al., Multiple Component Analysis of Fiber Length Distributions. URL: < www.uwsp.edu/papersci/Documents/ring/CPPA.pdf >, retrieved from the Internet Mar. 13, 2016.

DLK Double Lined Kraft, Retrieved from the Internet: <http://www.recycle.net/specs/gr120538.html?affilid=100029>, retrieved from the Internet Feb. 1, 2016.

Dennis E. Gunderson et al., Reclaiming fiber from newsprint dry methods, Journal of Hazardous Materials, 29 (1992) 297-311, Elsevier Science Publishers B.V., Amsterdam.

T.J. Heindel and J.L. Monefeldt, Instituteof Paper Science and Technology Atlanta, Georgia, IPST Technical Paper Series No. 639, Flash X-Ray Radiography for Visualizing Gas Flows in Opaque Liquid/Fiber Suspensions, Feb. 1997.

Bei-Hong Liang et al., Recycled fiber quality from a laboratory-scale blade separator/blender, Forest Products Journal, vol. 44. No. 7/8, pp. 47-50, Jul./Aug. 1994.

(Continued)

*Primary Examiner* — Camie S Thompson

(74) *Attorney, Agent, or Firm* — Vorys, Sater, Seymour and Pease LLP; Pradip Sahu; Philip T. Petti

(57) ABSTRACT

A roof cover board made from a mixture of 30-60% stucco; 20-50% perlite; 10-30% cellulose fiber; 3-20% starch; and siloxane. Also disclosed is a stucco-free roof cover board made from a mixture of 30-60% perlite, 30-60% cellulose fiber, 5-25% starch; and siloxane. Also disclosed are methods for making same.

20 Claims, No Drawings

(56) References Cited

OTHER PUBLICATIONS

Newsprint (40% postconsumer fiber), JCP A10, Feb. 1, 1999.
OCC: Old Corrugated Containers, the New Mexico Recycling Coalition, 2009.
Mini-Encyclopedia of Papermaking Wet-End Chemistry, Old Corrugated Container Pulp (OCC), Retrieved from the Internet: <http://www4.ncsu.edu/~hubbe/OCC.htm>, retrieved from the Internet Feb. 11, 2016.
Seminole Secondary Fiber Specifications Double-Lined Kraft Corrugated (DLK), RockTenn, Updated Sep. 2011.
What is testliner?, Retrieved from the Internet: <http://www.answers.com/Q/What_is_testliner>, retrieved from the Internet Feb. 11, 2016.
Chemical Abstracts, Apr. 16, 1990, p. 336, XP000156707, ISSN: 0009-2258.
International Search Report dated Jan. 10, 2017 for International Application No. PCT/US2016/055633 to United States Gypsum Company filed Oct. 6, 2016.

* cited by examiner

LIGHT WEIGHT GYPSUM FIBER PANEL SUITABLE FOR USE AS ROOF COVER BOARD

CROSS-REFERENCE TO RELATED APPLICATIONS

This claims the benefit of U.S. provisional patent application No. 62/242,388 filed Oct. 16, 2015, incorporated herein by reference.

FIELD OF THE INVENTION

The present invention provides a gypsum fiber based board suitable as entry level roof cover board. The product in this invention is a gypsum fiber based roofing panels. The invention also provides a stucco-less formulation for an improved perlite-fiber board. The stucco-less perlite board comprising particles of expanded perlite, cellulose fiber, and starch.

BACKGROUND OF THE INVENTION

The roofing systems for commercial and industrial building roofs with low-slope roof decks typically include one or more layers of a low-density roofing insulation, a layer of roofing cover boards that overlie the low-density roofing insulation layer(s), and a waterproofing membrane that overlies the layer of cover boards. The layer(s) of low-density insulation, such as a low-density polymer-based foam insulation, if not protected, can be partially crushed or otherwise damaged from worker traffic over the insulation, the placement of heavy objects on the insulation, the weather, and other causes commonly encountered in roofing construction. The layer of roofing cover boards that overlies the one or more layers of low-density insulation, protects the more fragile low density insulation from damage, acts as a fire barrier, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the roofing cover boards, and the waterproofing membrane) of the roofing system are separately manufactured and separately and successively applied to the low-slope roof deck.

Thus, roof cover board is typically used on top of roof insulation to provide a rigid, smooth top surface for the application of the membrane. It will protect the insulation from damages of foot traffic and give wind uplifting resistance and additional insulation to the roofing system. The application of cover board over mechanically attached insulation will also offer three other distinct advantages—(1) it reduces the shank length of the fastener, (2) it insulates the fastener/eliminating energy loss/possible thermal bridging at fasteners and insulation joints, and (3) it eliminates protrusions to the membrane surface from backed-out fasteners created by thermal contraction stress. The use of roof cover boards has become a standard method to enhance overall roof system performance for all low-slope roof systems.

Roof cover board currently on the market can be roughly divided into two categories—premium roof cover board and economical/entry level roof cover board. Premium roof cover board includes glass mat faced gypsum board (such as United States Gypsum Company's glass mat faced SECUROCK and Georgia Pacific's DENSDECK products) and fiber reinforced gypsum (such as United States Gypsum Company's gypsum-fiber SECUROCK, also known as "GF SECUROCK"). Entry level roof boards are primarily limited to wood fiber boards and perlite boards.

Premium roof cover board provides an excellent substrate for all types of conventional low-slope roofing membranes, particularly in fully adhered assemblies. The material is durable and provides superior impact and puncture resistance. However, this kind of cover board is normally heavy and expensive. Entry level roof cover board, on the other hand, does not have the quality of premium roof cover board, but is light weight and more affordable. Many builders and contractors prefer to use entry level roof cover board over premium roof board because of these two advantages. This is especially true for re-roofing applications.

Premium roof cover board includes glass mat faced gypsum board (such as USG's glass mat faced SECUROCK and Georgia Pacific's DENSDECK products) and fiber reinforced gypsum (such as USG's gypsum-fiber Securock). Entry level roof board includes primarily wood fiber board and Perlite Board. There is currently no gypsum fiber based light weight entry level roof cover board on the market.

U.S. Pat. Nos. 3,988,199, 4,126,512, 5,749,954, and 6,149,831 described formulations and manufacturing processes to make perlite boards. However, these formulations all have asphalt/bituminous material in them, either as internal additive or coating material to impart binding or water repellant properties to the perlite board. Asphalt is a highly combustible material and will significantly reduce the fire performance of the perlite board. In addition, Newsprint was used in the formulations to impart flexural strength. Newsprint (also known as "News") is normally made with mechanical pulp or semi-mechanical pulp which has stiff and short cellulose fibers. Post-consumer Newsprint also contained a significant amount of ink which will work as a filler to lower the strength of the perlite board. Lastly, the amounts of starch used in these formulations are less than 5% of the total weight of solid materials in the formulation. This will result in a perlite board which is relatively weaker.

Gypsum fiber products, such as USG's GF SECUROCK, could be considered a heavy weight material. It is made using gypsum and cellulose fibers.

SUMMARY OF THE INVENTION

The present inventors note in contrast to the compositions of the above-listed patents flexural strength achieved through the use of short fibered Newsprint will be significantly less than what can be achieved if a longer fiber paper source, such as OCC or DLK is employed.

It was found surprisingly that, by incorporating perlite and starch into a gypsum fiber cover board, a light weight gypsum based entry level roof board can be made with desirable properties that are comparable with organic wood fiber roof board.

In a first embodiment the board of the present invention is stucco based. The stucco based board is made from a mixture of the following ingredients, in wt. % on a water fee basis:

30-60% stucco, preferably 30-50%

20-50% perlite, 10-30% cellulose fiber, preferably recycled cellulose fiber, 3-20% starch; and siloxane.

Preferably the board is made from a mixture of 30-50% stucco; 20-50% perlite; 15-30% cellulose fiber; 8-20% starch; and 0.2 to 2% siloxane.

More preferably the board is made from a mixture of 40-50% stucco, 20-35% perlite, 20-30% cellulose fiber and 5-15% starch, as well as 0.2 to 2% siloxane. Preferably the cellulose fiber is recycled cellulose fiber, most preferably recycled cardboard because this provides good strength and low cost.

The product of the first embodiment is made using a wet forming process in which all the components mentioned above are mixed in water to form a furnish. The furnish with a consistency of 5-15% will be dewatered on a moving wire to form a pad and then be pressed to further remove water and achieve desired thickness and surface smoothness. Thus formed green board will be given some time for the stucco to set and then dried in kiln. Comparing with wood fiber board and Perlite Board, the gypsum fiber based entry level roof board of the first embodiment of the present invention has a more robust feel and improved fire performance.

The thickness of the product of the first embodiment can be between ¼" and 1", with a preferred thickness of ½". For a ½' thick product, the board weight can be between 500 and 900 lbs/MSF (pounds/thousand square feet).

The density of the board of the first embodiment is between 12 and 22 lbs/ft$^3$, with a preferred density between 15 and 19 lbs/ft$^3$. The product for the first embodiment has a Modulus of Rupture (MOR) of at least 150 psi and a compressive strength of at least 100 psi.

In a second embodiment the present invention provides a stucco-free formulation for an improved perlite-fiber board with the following attributes:

A fiber perlite board which comprises, in wt. %:

30-60% perlite, 30-60% cellulose fiber, preferably recycled cellulose fiber, and 5-25% starch.

The fiber perlite board having an absence of stucco.

Preferably the perlite-fiber board contains 45-55% perlite, 30-60% recycled cellulose fiber and 8-12% starch.

The perlite-fiber board having a thickness of 0.25-1 inch, typically ½ inch. The perlite board comprising particles of expanded perlite, recycled cellulose fiber, and starch The board of the second embodiment has a board weight between 400 and 750 lbs/MSF, with a preferred board weight between 450 and 600 lbs/MSF.

The density of the board of the second embodiment is between 10 and 17 lbs/ft$^3$, with a preferred density between 11 and 14 lbs/ft$^3$. The product for the second embodiment has a MOR of at least 150 psi and a compressive strength of at least 90 psi.

The product for the second embodiment is made using a wet forming process in which all the components mentioned above are mixed in water to form a furnish. The furnish with a consistency of 3-10% will be dewatered on a moving wire to form a pad and then be pressed to further remove water and achieve desired thickness and surface smoothness. Thus formed green board then dried in kiln. In the present description all composition percentages and ratios are by weight unless otherwise indicated.

Definitions

As used herein, the term "pulp" refers to fibers from natural sources such as woody and non-woody plants. Woody plants include, for example, deciduous and coniferous trees. Non-woody plants include, for example, cotton, flax, esparto grass, milkweed, straw, jute hemp, and bagasse.

As used herein, the term "average fiber length" refers to a weighted average length (also known as length weighted length) of pulp fibers determined utilizing an optical fiber analyzer such as, for example, a Kajaani fiber analyzer model No. FS-100 or FS-200 available from Kajaani Oy Electronics, Kajaani, Finland or another manufacturer such as OpTest Equipment Inc. According to the test procedure, a pulp sample is treated with a macerating liquid to ensure that no fiber bundles or shives are present. Each pulp sample is disintegrated into hot water and diluted to an approximately 0.001% solution. Individual test samples are drawn in approximately 50 to 100 ml portions from the dilute solution when tested using the standard Kajaani fiber analysis test procedure. The weighted average fiber length may be expressed by the following equation:

$$\sum_{x_i}^{k} (x_i * n_i)/n$$

wherein, k=maximum fiber length $x_i$=fiber length $n_i$=number of fibers having length $x_i$; and n=total number of fibers measured.

As used herein, the term "low-average fiber length pulp" refers to pulp that contains a significant amount of short fibers and non-fiber particles. Many secondary wood fiber pulps may be considered low average fiber length pulps; however, the quality of the secondary wood fiber pulp will depend on the quality of the recycled fibers and the type and amount of previous processing. Low-average fiber length pulps may have an average fiber length of less than about 1.2 mm as determined by an optical fiber analyzer such as, for example, a Kajaani fiber analyzer model No. FS-100 or FS-200 (Kajaani Oy Electronics, Kajaani, Finland) or optical fiber analyzer made by another manufacturer. For example, low average fiber length pulps may have an average fiber length ranging from about 0.7 to 1.2 mm. Exemplary low average fiber length pulps include virgin hardwood pulp, and secondary fiber pulp from sources such as, for example, office waste, newsprint, and paperboard scrap.

As used herein, the term "high-average fiber length pulp" refers to pulp that contains a relatively small amount of short fibers and non-fiber particles. High-average fiber length pulp is typically formed from certain non-secondary (i.e., virgin) fibers. Secondary fiber pulp that has been screened may also have a high-average fiber length. High-average fiber length pulps typically have an average fiber length of greater than about 1.5 mm as determined by an optical fiber analyzer such as, for example, a Kajaani fiber analyzer model No. FS-100 or FS-200 (Kajaani Oy Electronics, Kajaani, Finland) or optical fiber analyzer made by another manufacturer. For example, a high-average fiber length pulp may have an average fiber length from about 1.5 mm to about 6 mm. Exemplary high-average fiber length pulps that are wood fiber pulps include, for example, bleached and unbleached virgin softwood fiber pulps.

DETAILED DESCRIPTION OF THE PREFERRED EMBODIMENTS

Compositions

In a first embodiment the board is stucco based.

Gypsum fiber products, such as USG's GF SECUROCK, could be considered a heavy weight material. It is made using gypsum and cellulose fibers. It was found surprisingly that by incorporating perlite and starch into a gypsum fiber cover board, a light weight gypsum based entry level roof board can be made with desirable properties that are comparable with organic wood fiber roof board.

A. First Embodiment

In a first embodiment the board is stucco based. The stucco based board made from a mixture of the following ingredients, in wt. % on a water free basis:

30-60% stucco (calcium sulfate hemihydrate), preferably 30-50%

20-50% perlite, 10-30% cellulose fiber, preferably recycled cellulose fiber, 3-20% starch, and siloxane.

Preferably the board contains 30-50% stucco; 20-50% perlite; 15-30% cellulose fiber; 8-20% starch; and 0.2 to 2% siloxane. More preferably the board contains 40-50% stucco, 20-35% perlite, 20-30% cellulose fiber and 5-15% starch, and 0.2 to 2% siloxane.

The preferred cellulose fiber is recycle OCC (old corrugated container) or DLK (double lined kraft) which has relatively long fiber, for example about 1-4 mm, to provide better flexural strength. Thus, it is understood in the art to generally be longer than that in newsprint.

The preferred perlite is expanded perlite with a density between 2 and 20 lbs/ft$^3$ can be used, but the preferred density is between 5-12 lbs/ft$^3$.

Any kind of starch, such as corn, wheat, tapioca, etc., or synthetic latex binder can be used as a binding material, but corn starch is preferred because of it is readily available and relative low on price.

Siloxane, together with a catalyst, such as magnesium oxide, can be used to give the product water resistance. Other additives or processing aids, such as accelerator, retarder and retention polymer, may also be used during the manufacturing process. A surface coating is optional to give some improved surface properties to the product. The manufacturing cost of such a product of the present invention will be significantly lower than that of typical heavy weight gypsum fiber products.

Comparing with other entry level roof boards on the market, this stucco based light weight roof cover board provides improved rigidity, fire resistance and dimensional stability.

The product of the first embodiment is made using a wet forming process in which all the components mentioned above are mixed in water to form a furnish. The furnish with a consistency of 5-15% will be dewatered on a moving wire to form a pad and then be pressed to further remove water and achieve desired thickness and surface smoothness. Thus formed green board will be given some time for the stucco to set and then dried in kiln. Comparing with wood fiber board and Perlite Board, the gypsum fiber based entry level roof board has a more robust feel and improved fire performance.

The thickness of the product can be between ¼" and 1", with a preferred thickness of ½". For a ½' thick product, the board weight can be between 500 and 900 lbs/MSF.

The density of the board of the first embodiment is between 12 and 22 lbs/ft$^3$, with a preferred density between 15 and 19 lbs/ft$^3$. The product for the first embodiment has a MOR of at least 150 psi and a compressive strength of at least 100 psi with a preferred MOR range of 180-300 psi and a preferred compressive strength range of 120-150 psi.

Thus, the board of the first embodiment is made from a mixture of the ingredients listed in TABLE 1. Each "Preferred" range is individually a preferred range for the invention. Thus, preferably any "Preferred" range can be independently substituted for a corresponding "Useable range".

TABLE 1

(amounts in wt. % on a water free basis)

| Ingredient | Useable | Preferred | Most Preferred |
|---|---|---|---|
| Stucco (calcium sulfate hemihydrate) | 30-60% | 30-50 | 40-50% |
| perlite | 20-50% | 20-50 | 20-35% |
| cellulose fiber | 10-30% | 15-30 | 20-30% |
| starch | 3-20% | 8-20 | 8-15% |
| Siloxane | suitable amount to provide water resistance | 0.2 to 2 | 0.4 to 1 |
| Ground gypsum (calcium sulfate dihydrate)** | 0.1-2.0% | 0.2-1.0% | 0.3-0.8% |
| magnesium oxide | 0-2.0% | 0.1-1.0% | 0.2-0.5% |
| Optional ingredients | 0-1.0% | 0-0.5% | 0-0.4% |

*The optional ingredients include accelerators, such as potassium sulfate or aluminum sulfate and other additives such as retarders, retention polymers, biocides, fungicides, waterproofing agents, and the like. The optional ingredients are further discussed elsewhere in this specification.

**ground gypsum typically comprises particles having particle sizes of 2 to 200 microns, typically the mean particle size is 10 to 40 microns, preferably the mean particle size is 20 to 35 microns.

The invention can have an absence of any of these optional elements.

The board of the first embodiment has the properties listed in TABLE 2. Each "Preferred" range is individually a preferred range for the invention. Thus, preferably any "Preferred" range can be independently substituted for a corresponding "Useable range".

TABLE 2

Board Properties

| Properties | Broad | Preferred |
|---|---|---|
| Board thickness (Inches) | between 1/4" and 1" | 1/2 inch |
| Board weight of 1/2 inch thick board (lbs/MSF) | between 500 and 900 | |
| Board Density (lbs/ft$^3$) | between 12 and 22 | |
| MOR (psi) | at least 150 | |
| Compressive strength (psi) | at least 100 | |

Comparing with other entry level roof boards on the market, this stucco based light weight roof cover board provides improved rigidity, fire resistance and dimensional stability.

B. Second Embodiment—Perlite-Fiber Board

In a second embodiment the present invention provides a stucco-less formulation for an improved perlite-fiber board with the following attributes:

A perlite-fiber board which comprises, in wt. %:

30-60% perlite (preferably 45-55%), 30-60% recycled cellulose fiber (preferably 35-45%), 5-25% starch (preferably 8-12%), and siloxane.

The perlite-fiber board preferably has an absence of stucco.

The perlite-fiber board has a thickness of 0.25-1 inch, typically ½ inch and comprises particles of expanded perlite, recycled cellulose fiber, and starch.

For the second embodiment the preferred cellulose fiber is recycle OCC (old corrugated container) or DLK (double lined kraft) which has relatively long fiber to provide better flexural strength. The preferred perlite is expanded perlite with a density between 2 and 20 lbs/ft$^3$ can be used, but the preferred density is between 5-12 lbs/ft$^3$. Any kind of starch, such as corn, wheat, tapioca, etc., or synthetic latex binder can be used as a binding material, but corn starch is preferred because of it is readily available and relative low on price. Siloxane, together with a catalyst, such as magnesium oxide, can be used to give the product water resistance. Other additives or processing aids, such as accelerator, retarder and retention polymer, may also be used during the manufacturing process. A surface coating is optional to give some improved surface properties to the product.

Preferably the perlite-fiber board contains 45-55% perlite, 30-60% recycled cellulose fiber and 8-12% starch.

The thickness of the perlite-fiber board can be between ¼" and 1", with a preferred thickness of ½". For a ½' thick product, the board weight can be between 400 and 750 lbs/MSF, with a preferred board weight between 450 and 600 lbs/MSF.

The density of the perlite-fiber board is between 10 and 17 lbs/ft$^3$, with a preferred density between 11 and 14 lbs/ft$^3$. The perlite-fiber board has a MOR of at least 150 psi and a compressive strength of at least 90 psi.

The perlite-fiber board for the second embodiment is made using a wet forming process in which all the components mentioned above are mixed in water to form a furnish. The furnish with a consistency of 3-10% will be dewatered on a moving wire to form a pad and then be pressed to further remove water and achieve desired thickness and surface smoothness. Thus formed green board will be dried in kiln.

Thus, the perlite-fiber board of the second embodiment is made from a mixture of the ingredients listed in TABLE 3. Each "Preferred" range is individually a preferred range for the invention. Thus, preferably any "Preferred" range can be independently substituted for a corresponding "Useable range".

TABLE 3

(amounts in wt. % on a water free basis)

| Ingredient | Broad | Preferred |
|---|---|---|
| perlite | 30-60% | 45-55% |
| recycled cellulose fiber | 30-60% | 35-45% |
| starch | 5-25% | 8-12% |
| siloxane | 0.2-2% | 0.4-1% |
| Magnesium oxide | 0-2.0% | 0.1-1.0% |
| Optional ingredients* | 0-1.0% | 0-0.5% |

*The optional ingredients include retention polymers, biocides, fungicides, waterproofing agents, and the like. The optional ingredients are further discussed elsewhere in this specification.

The invention can have an absence of any of these optional elements.

Thus, the board of the second embodiment has the properties listed in TABLE 4. Each "Preferred" range is individually a preferred range for the invention. Thus, preferably any "Preferred" range can be independently substituted for a corresponding "Useable range".

TABLE 4

Board Properties

| Properties | Broad | Preferred |
|---|---|---|
| Board thickness (Inches) | between 1/4" and 1" | 1/2 inch |
| board weight of 1/2 inch thick board (lbs/MSF) | between 400 and 750 | |
| Board Density (lbs/ft$^3$) | between 10 and 17 | between 11 and 14 |
| MOR | at least 150 psi | |
| compressive strength (psi) | at least 90 | |

The product weight and manufacturing cost of such a product of the second embodiment will be significantly lower than that of typical heavy weight gypsum fiber products.

Stucco

Stucco is known in the art as calcium sulfate hemihydrate.

The panel of the first embodiment comprises stucco. However, the panel of the second embodiment has an absence of stucco.

Perlite

An ingredient of the compositions of the invention (of both the first and second embodiments) is a perlite.

The perlite of the first and second embodiments is preferably expanded perlite with a density between 2 and 20 lbs/ft$^3$, but the preferred perlite density is between 5-12 lbs/ft$^3$.

Expanded perlite is preferred for its low cost and performance. The expanded perlite provides porosity and "loft" in the final product, which enhances acoustical properties.

Perlite is a form of glassy rock, similar to obsidian with the capacity to expand greatly on heating. Perlite generally contains 65-75 wt % $SiO_2$, 10-20 wt % $Al_2O_3$, 2-5 wt % $H_2O$, and smaller amounts of sodium, potassium, iron and calcium oxides. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional process of preparing expanded perlite, the perlite ore is first ground to a fine size. The perlite is expanded by introducing the finely ground perlite ore into the heated air of a perlite expander. Typically the expander heats the air to about 1750° F. The finely ground perlite is carried by the heated air which heats the perlite and causes it to pop like popcorn to form the expanded perlite having a density of about 3 to 10 pounds per cubic foot. When expanded perlite is placed in contact with water, the water penetrates the cracks and fissures and enters into the air filled cavities of the perlite, thereby causing the perlite to retain large amounts of water within the expanded perlite particles.

Using the relatively high density perlite, i.e., a perlite which has been expanded to a density of over 7 or 8 pounds per cubic foot (versus the normal range of 3 to 5 pounds per cubic foot), lowers the water needed to form a suitable slurry. See, U.S. Pat. No. 5,911,818 to Baig. The aqueous slurry with less water requires less dewatering, and produces a base mat having less water retained by the perlite. The resulting product has improved compressive resistance and maintained fire ratings, as defined by ASTM Test No. E119. The base mat having a lower water content can be dried faster which allows the entire water felting line to be run at higher speed.

High density perlite is also beneficial when manufacturing fire rated ceiling tiles which must meet a minimum density. However, when the density of the expanded perlite exceeds about 20 pounds per cubic foot, the perlite does not produce as much "loft" or bulk in the final product. As a result, the density of the final product may be too high to maintain the low thermal conductivity required to pass the ASTM E119 fire endurance test.

Prior to use, the expanded perlite is optionally at least partially coated with a coating. Preferred coatings include silicon coatings and polymeric coatings. The coatings are applied to the expanded perlite using any practical coating method. Spraying is the preferred method of applying the coating. While not wishing to be bound by theory, it is believed the coating limits water absorption by reducing the amount of water that enters the interior of the aggregate particles. When less water is absorbed, less energy is required to drive off this excess water, reducing the kiln temperature or the residence time of the product in the kiln.

Cellulose Fiber

A major component in the compositions of this invention (both the first and the second embodiment) is the recycled cellulose fiber (also known in the art as recycled cellulosic fibers), which serves to provide both wet strength (i.e., the strength of the wet mat prior to drying) and dry strength. The cellulose fiber may also function as a binder and may help to retain fines.

Cellulose fibers can be obtained from the bark, wood or leaves of plants, or from a plant-based material. Besides cellulose, these fibers are compound of hemicellulose and lignin, and different percentages of these components are responsible for different mechanical properties observed.

The cellulose fiber is virgin cellulose fiber and/or recycled cellulose fiber.

The term virgin cellulose fiber means cellulose fibers which have not been recycled from a consumer product. In contrast, recycled cellulose fiber is the fiber obtained by slashing formed consumer paper products into individual fibers.

Recycled paper is sorted into categories, such as Old News Paper (ONP, also known as Newsprint), Old Magazine (OMG), Mixed Office Waste (MOW), and Old Corrugated Containers (OCC). Newsprint and magazine paper are often Thermomechanical pulp (TMP) or a mixture of TMP and kraft pulp with the addition of fillers and, in the case of magazine paper, clay coating. Office paper, on the other hand, may be made entirely of kraft pulp. Corrugated paperboard, used for shipping containers and similar products, consists of softwood kraft pulp that has often not been brightened or bleached for liner and recycle pulp for medium. It often contains sizing and strength additives to improve its durability, and it may or may not have printing on its surfaces, although it does contain adhesives that hold the layers of facing and corrugation together.

Preferably the cellulose fiber is from corrugated container board (also known as Old Corrugated Container, OCC) or double lined kraft (DLK). Typically in the process of the invention the dry OCC is first slashed in a hydropulper in water at about 2-6%, typically 4%, consistency and the pulp obtained is then mixed with other components of the formulation to make the Entry Level Roof board.

Corrugated refers to those boxes where the materials is made from three separate layers of paper, two liners and a corrugated or wavy layer sandwiched between them. Thus, corrugated containers have an inner layer of liner board, an outer layer of liner board, and a corrugated layer which is a fluted medium between the two layers of liner board. Thus, the four main components of "old corrugated container" (OCC) pulps are unbleached softwood kraft pulp (mainly from the linerboard), semi-chemical hardwood pulp (from the fluted medium), starch (as an adhesive), and water (often 8% or more). The starch added in the present invention does not include the starch natively present in OCC.

OCC covers all corrugated cardboard boxes. In particular, the corrugated containers are printed or unprinted, flattened or compacted corrugated containers made of two sheets of linerboard sandwiching a layer of fluting to make what is commonly referred to as a cardboard box. OCC is corrugated containers having liners of either test liner, jute, or kraft. OCC does not include waxed cardboard (commonly produced from boxes), paper board (flat rigid paper from beverage, cereal, tissue or other boxes). Wax-containing corrugated boxes (for fruits, chickens, etc.) should be separated from the incoming supply to avoid contamination. Softwood kraft of the liners have longer fibers than the high-yield hardwood fibers from the corrugated layers of boxes.

DLK (Double Lined Kraft) consists of clean sorted unprinted corrugated cardboard cartons, boxes, sheet or trimmings, and must be Kraft or jute liner content. It may not contain staples or tape, hot melt (or non-water soluble) glues or any foreign materials. It consists of new corrugated cuttings having liners of either test liner, jute, or kraft. Treated medium or liners, insoluble adhesives, butt rolls, slabbed or hogged medium, are not acceptable in this grade.

The compositions of the invention, as well as the slurry of the process for making the roof cover boards of the invention, preferably has 0% of the cellulose fiber provided by paper sludge obtained from pulp and paper processing waste.

The compositions of the invention, as well as the slurry of the process for making the roof cover boards of the invention, preferably has 0% of the cellulose fiber provided by newsprint. Newsprint is from recycled newspapers. Thus, the present compositions preferably have an absence of newsprint. The present inventors theorize flexural strength and MOR achieved through the use of short fibered Newsprint will be significantly less than what can be achieved if a longer fiber paper source, such as OCC or DLK.

The cellulose fibers of the present invention are different from the wood fibers of U.S. Pat. No. 8,936,855 to Kimuro et al. U.S. Pat. No. 8,936,855, discloses "chipping wood into wood chips using a crusher or the like, steaming the obtained wood chips, and fibrillating the steamed chips using a refiner pulper. The wood fibers may also contain wood fibers in the form of fibers obtained through steaming and fibrillating of scrap wood from scrap wood fiber boards." The wood fiber in U.S. Pat. No. 8,936,855 is actually tiny wood chips which have almost all the lignin, hemicelluloses and other minor components of unprocessed wood in it. The fibers are stiff and will break under load. In contrast, the cellulose fiber used in the present invention are virgin or preferably recycled fiber chemically treated to remove the majority of the lignin from the wood fiber starting material. As a result the cellulose fibers are is soft and pliable.

Preferably the weighted average fiber length of the cellulose fibers of the present invention is greater than 1.4 mm, more preferably greater than 1.5 mm, furthermore preferably greater than 1.6 mm, most preferably 1.6 to 6 mm, and most preferably OCC having a weighted average fiber length of 1.6 to 2.5 mm. Also, preferably the fibers have a mean length of greater than 0.5 mm.

Starch

Any kind of starch, such as corn, wheat, tapioca, etc, or synthetic latex binder can be used as a binding material of both the first and second embodiments. Corn starch is the preferred binder. Preferably the binder is solely corn starch. Corn starch is readily available and relative low in price.

The starch can be either pre-gelled (cooked) or an acid-modified starch or The starch can be not pre-gelled. Not-pre-gelled starch is preferred.

Preferably the binder has an absence of latex. Preferably the binder has an absence of polyamine epichlorohydrin resins.

Suitable examples of pregelatinized starch include, but are not limited to, PCF 1000 Starch, commercially available from Lauhoff Grain Company and AMERIKOR 818 and HQM PREGEL starches, both commercially available from Archer Daniels Midland Company, starches such as USG95 (United States Gypsum Company, Chicago, Ill.).

Siloxane

Siloxane, together with a catalyst, such as magnesium oxide, will be used to give the product (of both the first and second embodiments) water resistance.

Siloxanes will be used for imparting water resistance to the finished product. When siloxanes are employed, catalysts, such as alkaline earth oxides and hydroxides, will also be employed. alkaline earth oxides and hydroxides are known to accelerate the curing reaction of siloxane in a stucco slurry. For example, magnesium oxide ("MgO") is known to catalyze siloxane reactions.

Other Additives or Processing Aids

Other additives or processing aids, such as accelerator, retarder and retention polymer, may also be used during the manufacturing process for the panels of the first and second embodiments of the invention. A surface coating may also be optionally included to give some improved surface properties to the product for both the first and second embodiments. Typical surface coatings for both the first and second embodiments of the invention are polyacrylics or polyacrylates.

Other potential additives to the panels of the first and second embodiments of the invention are biocides to reduce growth of mold, mildew or fungi. The biocide can be added to the panel surface or throughout the panel composition. Examples of biocides include boric acid, pyrithione salts and copper salts. Pyrithione is known by several names, including 2-mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative (C5H4NOSNa), known as sodium pyrithione (CAS Registry No. 3811-73-2), is one embodiment of this salt that is particularly useful. Pyrithione salts are commercially available from Arch Chemicals, Inc. of Norwalk, Conn., such as Sodium OMADINE or Zinc OMADINE.

Preferably there is an absence of asphalt or any other bituminous material. Bitumen is a black or dark-colored (solid, semi-solid, viscous), amorphous, cementitious material that can be found in different forms, such as rock asphalt, natural bitumen, tar and bitumen derived from oil, which is referred to as petroleum bitumen.

Preferably for both the first and second embodiments there is less than 5% polymer, more preferably there is an absence of polymer. The polymer is any polymer material, e.g., polyacrylates, polyacrylics, latexes, polyacrylamide, polyethylene, polypropylene, polybutylene, polystyrene, polyisocyanurate, polyurethane, polystyrene, or phenolic material or a material made of a blend of these materials.

Preferably for both the first and second embodiments there is an absence of phenolic resin.

Preferably for both the first and second embodiments there is an absence of polyacrylamide resin.

Preferably for both the first and second embodiments there is an absence of polyacrylic resin.

Preferably for both the first and second embodiments there is an absence of latex.

As used herein, the phrase "antimicrobial" or "antimicrobial agent" refers to a composition or moiety that can prevent the growth of *Escherichia coli* (ATCC #11229), *Staphylococcus aureus* (ATCC #6538) (both bacteria), and/or *Candida albicans* (ATCC #10231) (yeast). For example, in some embodiments, kill rates of microbes can be determined according to ASTM No. E2149-01, which is entitled "Determining the Antimicrobial Activity of Immobilized Antimicrobial Agents Under Dynamic Contact Conditions".

Accelerators

The first embodiment of the present invention may employ small amounts of accelerators (set accelerating agents). Accelerators, such as HRA (heat resistance accelerator) may be added to the composition to control the setting characteristics of the green (i.e., uncured) material of the first embodiment of the invention comprising stucco. Typical non-limiting additives include accelerators for calcium sulfate hemihydrate such as potash (potassium sulfate) and alum (aluminum sulfate). Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

CSA (climate stable accelerator) set accelerator comprises 95% calcium sulfate dihydrate co-ground with 5% sugar and heated to 250° F. (121° C.) to caramelize the sugar. CSA is available from USG Corporation, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Retarders

Use of set retarders as a component in the compositions of the first embodiment of the invention is particularly helpful in situations where the initial setting speed of the gypsum-based products is high. Retarders, such as VERSENEX 80 made by Dow Chemicals, may be added to the composition to control the setting characteristics of the green (i.e., uncured) material of the first embodiment of the invention comprising stucco. Without the addition of retarders, the stucco may set on the surfaces of the forming equipment and cause production issue.

The primary function of a retarder in the composition is to keep the slurry mixture from stiffening too rapidly.

Retention Polymers

Preferred retention polymers of both the first and second embodiments of the invention are selected from polyacrylamide based retention aids, such as NALCO 7128 OPTIMER. A retention polymer is a long chain polymer, normally a polyacrylamide, which can help fine particles in the formulation to retain in the final products.

Manufacturing Processes

The stucco-containing board product of the first embodiment may be manufactured using a wet forming process in which all the components mentioned above are mixed in water to form a slurry furnish. The furnish may have a consistency of 5-15% and may be dewatered on a moving wire to form a pad. Then the pad may be pressed to further remove water and achieve a desired thickness and surface smoothness. The pad may be cut into appropriate lengths to form uncured roof cover boards, also known as green board. Generally, the board is cut into large master panels (normally 12'×24') for ease of production. The master panel is further cut into the size (normally 4'×4', 4'×8' or 3'×5') of final products after being dried. The green board may be given time for the stucco to set and then dried in kiln as known in the art.

The method of manufacturing a roof cover board of the first embodiment, uses a wet forming process comprising:

- mixing a composition containing stucco (the hemihydrate), perlite, cellulose fiber, starch and water to form a slurry furnish;
- depositing the slurry onto a moving wire;
- dewatering the slurry to form a pad;
- optionally, pressing the pad to further remove water and to achieve a desired thickness and surface smoothness;
- cutting the pad to form uncured roof cover boards;
- allowing the uncured boards to set; and
- drying the set boards in a kiln.

The stucco-free board product of the second embodiment is made using a wet forming process in which all the components mentioned above are mixed in water to form a furnish. The furnish for the stucco free panel with a consistency of 3-10% will be dewatered on a moving wire to form a pad and then be pressed to further remove water and achieve desired thickness and surface smoothness and then dried in kiln.

The method of manufacturing a roof cover board of the second embodiment, uses a wet forming process comprising:

- mixing all the perlite, recycled fiber, and starch in water to form a furnish with a consistency of 3-10%,
- dewatering the furnish on a moving wire to form a pad,
- optionally pressing the pad to further remove water and achieve desired thickness and surface smoothness to form green board,
- cutting the green board; and
- drying the cut green board in a kiln.

The following specific examples further illustrate the above described first and second embodiments of the invention. Unless specified to the contrary, all amounts are expressed as parts by weight on a dry solids total weight basis. Also, unless specified to the contrary, all amounts are expressed as percent are in weight percent. These examples are for illustration only and are not to be construed as limitations on this disclosure.

EXAMPLES

A. Examples of the First Embodiment Boards with Stucco

Example 1A

Sample boards were made, and the properties of the boards are shown in TABLE IA below. Samples of commercially available wood fiber board and perlite board, as well as United States Gypsum Company's premium gypsum fiber SECUROCK roof board, were also included in the table for comparison.

For this example, ½ inch gypsum fiber based entry level roof board was made in the lab on a Tappi Former using stucco, HRA (heat resistant accelerator), perlite, corn starch, and paper fiber. Three different kinds of stucco were tried, CKS (continuous kittle stucco) beta stucco, FST beta stucco (kettle beta stucco modified in a fluidized bed stucco treatment chamber) and B-base alpha stucco. Paper fiber was recycled fiber generated in the lab from corrugated box board. Prescribed amounts of paper fiber (4% pulp) and water were put in a 5-gallon bucket and agitation using a lab mixer at 70 RPM was started. Premixed stucco, HRA (a fixed 2% based on the weight of stucco), perlite and starch were then added to the pulp slurry in the bucket and the agitation continued for a total of 60 seconds. When applicable, siloxane emulsion, made using a WARING blender at high speed, was added to the mixture in the bucket 20 seconds before the end of agitation. Whenever siloxane is used, a powder magnesium oxide (MgO) at the MgO/siloxane ratio of 0.5 was also added to the powder mixture of stucco-HRA-perlite-starch mentioned above. NALCO OPITIMER 7128 flocculant at the concentration of 0.1% and dosage of 0.2 lbs/MSF was added to the mixture 10 seconds before the end of mixing to achieve better retention of the materials and more even distribution of perlite in the final product. The siloxane in the examples was methyl hydrogen siloxane. At the end of agitation, furnish in the bucket was poured into the TAPPI Former and water is removed to make a 14.75"×14.75" lab board. After vacuuming and pressing, the board was left on bench for 30 minutes for the stucco to set. The set board was then dried in oven and tested.

TABLE IA

| TAPPI Boards Made in Example 1A | | | | | | | | | | | | |
|---|---|---|---|---|---|---|---|---|---|---|---|---|
| Sample description | A1 | A2 | A3 | A4 | A5 | A6 | A7 | A8 | A9 | Wood Fiber Board | Perlite Board | GF SECUROCK |
| % pulp, % | 15.0 | 10.0 | 15.0 | 15.0 | 20.0 | 10.0 | 10.0 | 10.0 | 10.0 | | | |
| Perlite percentage, % | 30.0 | 35.0 | 30.0 | 25.0 | 30.0 | 35.0 | 35.0 | 35.0 | 35.0 | | | |
| Starch percentage, % | 10.0 | 10.0 | 10.0 | 10.0 | 15.0 | 15.0 | 15.0 | 15.0 | 15.0 | | | |
| (Stucco + HRA) percentage, % | 45.0 | 45.0 | 45.0 | 50.0 | 35.0 | 40.0 | 40.0 | 40.0 | 40.0 | | | |
| Siloxane dosage, lbs/MSF | 0.0 | 0.0 | 0.0 | 0.0 | 6.0 | 6.0 | 10.0 | 10.0 | 10.0 | | | |
| Board weight, lbs/MSF | 565 | 561 | 782 | 759 | 664 | 648 | 667 | 639 | 660.8 | 706 | 576 | 2520 |
| 4' × 8' Wt., lbs | 18.1 | 18.0 | 25.0 | 24.3 | 21.2 | 20.7 | 21.3 | 20.5 | 21.1 | 22.6 | 18.4 | 80.6 |
| Board thickness, in | 0.534 | 0.542 | 0.590 | 0.571 | 0.572 | 0.546 | 0.545 | 0.536 | 0.550 | 0.522 | 0.509 | 0.498 |
| Density, lbs/cu ft | 12.7 | 12.4 | 15.9 | 16.0 | 13.9 | 14.2 | 14.7 | 14.3 | 14.4 | 16.23 | 13.58 | 60.72 |
| Flexural peak load, lbf | 13.9 | 12.8 | 24.6 | 24.9 | 21.5 | 20.5 | 19.5 | 23.0 | 21.9 | 32.3 | 14.3 | 84.32 |
| Compressive strength, psi | 82.2 | 58.8 | 121.6 | 106.4 | 113.8 | 99.2 | 97.3 | 85.6 | 96.8 | 55.73 | 83.1 | 1490.45 |
| 2 hour water abs., % | 257.1 | 229.0 | 198.6 | 186.4 | 10.1 | 9.8 | 9.5 | 9.9 | 9.4 | 27.87 | 23 | 7.8 |

TABLE I-A shows the prototype boards A3-A9 had better compressive strength than both Wood Fiber board and Perlite Board on market. The flexural strength/MOR of the prototype lab boards are better that of Perlite Board, but not as good as that of board. ASTM C473 was followed for MOR/flexural peak load, except the specimen supports are spaced 10 inch, instead of 14 inch as specified in the ASTM C473. The width of the specimen was 6 inch, instead of 12 inch). Compressive strength was tested according to ASTM C209. 2 hour water abs. is 2 hr water absorption according to ASTM C473.

Example 2A

An experiment was carried out to investigate whether better MOR can be achieved with increased fiber percentage in the formulation. Procedures described in Example 1 were followed and FST stucco was used to make all the boards. The results from this investigation are summarized in TABLE II-A.

Comparing Samples A12-A16, the percentages of paper fiber in the formulations were increased gradually from 10% to 30%. The percentages of perlite and stucco were also reduced accordingly to keep board weight the same. It can be seen in TABLE II-A that the general trend is that the flexural strength/MOR of the board increased with the increase of paper fiber percentage in the formulation.

TABLE II-A

| Tappi Boards Made in Example 2 | | | | | |
|---|---|---|---|---|---|
| Samples | A12 | A13 | A14 | A15 | A16 |
| Target board wt, lbs/MSF | 650 | 650 | 650 | 650 | 650 |
| Paper fiber percentage, % | 10.0 | 15.0 | 20.0 | 25.0 | 30.0 |

TABLE II-A-continued

| Tappi Boards Made in Example 2 | | | | | |
|---|---|---|---|---|---|
| Samples | A12 | A13 | A14 | A15 | A16 |
| Perlite percentage, % | 35 | 32.5 | 30 | 27.5 | 25 |
| Starch percentage, % | 10 | 10 | 10 | 10 | 10 |
| Stucco percentage,% | 45.0 | 42.5 | 40.0 | 37.5 | 35.0 |
| Siloxane dosage, lbs/MSF | 6.0 | 6.0 | 6.0 | 6.0 | 6.0 |
| Actual board wt, lbs/MSF | 642 | 653 | 639 | 650 | 671 |
| 4' × 8' Wt., lbs | 20.6 | 20.9 | 20.5 | 20.8 | 21.5 |
| Board thickness, in | 0.480 | 0.495 | 0.510 | 0.509 | 0.526 |
| Density, lbs/cu.ft. | 16.1 | 15.8 | 15.1 | 15.3 | 15.3 |
| Flexural peak load, lbf | 17.09 | 20.63 | 21.04 | 21.95 | 23.50 |
| MOR, psi | 185.4 | 210.5 | 202.6 | 211.8 | 212.8 |
| Compressive, psi | 129.9 | 151.3 | 113.2 | 94.0 | 100.1 |
| 2 hour water abs., % | 7.93 | 9.37 | 9.99 | 10.57 | 9.69 |

Example 3A

In this example, the effect of stucco amount on different properties of the board was studied. The amount of stucco in each board was increased gradually, but the amounts of other materials in the formulations were kept the same. Therefore, the board weight also increased with the increased amount of stucco in each board. Procedures described in Example 1A were followed and FST stucco was used to make all the boards. The results from this investigation are summarized in TABLE III-A. Hygrometric expansion and thermal transmission of the TAPPI boards made in this round of experiment were also measured.

TABLE III-A

| TAPPI Boards Made in Example 3A | | | | | | | | |
|---|---|---|---|---|---|---|---|---|
| Samples | A23 | A24 | A25 | A26 | A27 | A28 | Wood Fiber Board | Perlite Board |
| Target Board weight, lb/MSF | 650 | 700 | 750 | 800 | 850 | 900 | NA | NA |
| Paper fiber percentage, % | 20.0 | 18.5 | 17.3 | 16.2 | 15.3 | 14.4 | NA | NA |

TABLE III-A-continued

| TAPPI Boards Made in Example 3A | | | | | | | | |
|---|---|---|---|---|---|---|---|---|
| Samples | A23 | A24 | A25 | A26 | A27 | A28 | Wood Fiber Board | Perlite Board |
| Pulp wt, g | 2198.5 | 2190.1 | 2194.3 | 2191.8 | 2199.4 | 2191.8 | NA | NA |
| Perlite percentage, % | 30.0 | 27.8 | 26.0 | 24.4 | 22.9 | 21.7 | NA | NA |
| Perlite wt, g | 148.4 | 148.1 | 148.4 | 148.6 | 148.1 | 148.6 | NA | NA |
| Starch percentage, % | 10.0 | 9.3 | 8.7 | 8.2 | 7.6 | 7.2 | NA | NA |
| Starch wt, g | 49.5 | 49.5 | 49.7 | 49.9 | 49.2 | 49.3 | NA | NA |
| Stucco percentage, % | 40.0 | 44.4 | 48.0 | 51.2 | 54.2 | 56.7 | 0.0 | 0.0 |
| Stucco wt, g | 197.9 | 236.5 | 274.0 | 311.7 | 350.6 | 388.4 | NA | NA |
| Board weight, lbs/MSF | 663.0 | 715.8 | 782.6 | 820.3 | 910.2 | 971.2 | 706.0 | 576.0 |
| 4' × 8' wt., lbs | 21.2 | 22.9 | 25.0 | 26.2 | 29.1 | 31.1 | 22.6 | 18.4 |
| Board thickness, in | 0.5 | 0.5 | 0.5 | 0.5 | 0.5 | 0.5 | 0.5 | 0.5 |
| Denisty, lbs/cu.ft. | 15.9 | 16.6 | 18.6 | 18.8 | 21.1 | 22.0 | 16.2 | 13.6 |
| Flexural peak load, lbf | 21.1 | 23.2 | 24.6 | 31.0 | 31.4 | 34.1 | NA | NA |
| MOR, psi | 197.3 | 232.0 | 241.2 | 282.3 | 292.7 | 303.7 | 296.3 | 138.0 |
| Compressive, psi | 131.1 | 160.0 | 163.3 | 181.5 | 185.9 | 206.1 | 55.7 | 83.1 |
| 2 hour water abs., % | 9.9 | 10.1 | 8.5 | 10.9 | 8.6 | 9.1 | 27.9 | 23.0 |
| Hygrometric expansion, in/in. RH | 4.2E−05 | 4.0E−05 | 3.6E−05 | 2.8E−05 | 3.8E−05 | 3.0E−05 | NA | NA |
| Thermal transmission, min:sec | 4:20 | 5:25 | 5:50 | 7:10 | 6:55 | 7:50 | 1:15 | 2:50 |

The flexural strength and compressive strength increased gradually with the increased usage of stucco in the board.

For hygrometric expansion, it can be seen the general trend is the higher the amount of stucco used in the formulation, the lower is the expansion, meaning stucco is able to improve the dimensional stability of the board. The Hygrometric Coefficient of Expansion is expressed in "Inches Per Inch Per Percent Of Relative Humidity". Hygrometric expansion Measurement was done on 3"×12" samples. Two metal buttons with small female cone shaped hole in the center were first glued on the sample with epoxy glue. The two buttons were approximately 10 inch apart. After the epoxy resin has fully set, the samples were left in a conditioned chamber to balance moisture and temperature at 70° F. and 50 RH (relative humidity) for two days. The distance between the two buttons was then measured using a digital gauge. The digital gauge also has a male cone shaped button on both ends and can be put into the female cone shaped holes on the buttons glued onto the samples. The relative humidity of the conditioned chamber was then reset to 90 RH and the temperature was kept at 50° F. The distance of the two buttons on the sample was re-measured after 3 days at the new relative humidity. The change in distance of the two buttons on the sample is considered as the hygrometric expansion and the result is expressed as the expansion in inch for each inch of sample length and each 1% change in relative humidity.

For thermal transmission (an indication of fire performance), the general trend is the that the higher the amount of stucco used in the formulation, the longer is the time needed to increase the temperature of unexposed side of the board from 40° C. to 200° C., indicating stucco will help improve the fire performance of the board. From the thermal transmission data, it can be expected that the fire performance of Entry level roof board, with the use of stucco in formulation, would be significantly better than that of Wood Fiber board and Perlite Board. Thermal expansion was tested according to ASTM C1795.

Example 4A

As discussed earlier, the use of stucco in the formulation will improve dimensional stability, fire performance, and is helpful for strength. On the other hand, the use of large amount of starch in the formulation for strength improvement will negatively affect the mold resistance of the board. Thus, there is a possibility a relatively large amount of stucco may be desired in the formulation for a better product within the category of Entry level roof board. If so, the board weight would have to be heavier. In this example, experiments were conducted targeting a heavier board weight of 800 lbs/MSF. Different percentages of paper fiber, perlite and stucco were used to find an combination with the best overall properties. Two starch usage levels, 8 lbs/MSF and 5 lbs/MSF were used.

Procedures described in Example 1A were followed and FST stucco was used to make all the boards. A corn starch different from the one used in the previous examples was used in the experiments of Example 4A.

TABLE IV-A

| TAPPI Boards Made in Example 4 | | | | | | | | | |
|---|---|---|---|---|---|---|---|---|---|
| Samples | A43 | A44 | A45 | A46 | A47 | A48 | A49 | A50 | A51 |
| Target board weight, lb/MSF | 800 | 800 | 800 | 800 | 800 | 800 | 800 | 800 | 800 |
| Paper fiber percentage, % | 12.0 | 15.0 | 20.0 | 25.0 | 28.0 | 35.0 | 20.0 | 28.0 | 35.0 |
| Perlite percentage, % | 26.5 | 25 | 22.5 | 20 | 18 | 16 | 22 | 19 | 16 |
| Starch percentage, % | 8 | 8 | 8 | 8 | 8 | 8 | 5 | 5 | 5 |
| Stucco percentage, % | 53.5 | 52.0 | 49.5 | 47.0 | 46.0 | 41.0 | 53.0 | 48.0 | 44.0 |
| Board weight, lbs/MSF | 764 | 785 | 820 | 805 | 797 | 857 | 882 | 877 | 873 |
| Board thickness, inches | 0.499 | 0.513 | 0.516 | 0.524 | 0.504 | 0.584 | 0.547 | 0.570 | 0.581 |
| Density, lbs/cu.ft. | 18.37 | 18.37 | 19.08 | 18.46 | 18.99 | 17.63 | 19.34 | 18.48 | 18.03 |
| Flexural peak load, lbf | 23.19 | 22.73 | 28.65 | 36.51 | 33.16 | 36.79 | 27.72 | 25.33 | 34.17 |
| MOR, psi | 232.8 | 216.3 | 269.0 | 333.1 | 327.0 | 270.1 | 231.6 | 195.2 | 253.1 |
| Compressive, psi | 147.1 | 187.6 | 137.5 | 140.0 | 165.8 | 150.2 | 175.5 | 111.4 | 109.8 |

TABLE IV-A shows for 800 lbs/MSF board, both the flexural strength/MOR and compressive strength of the boards were very good. 25% paper fiber, 20% perlite and 47% stucco (A46) was a good combination to achieve good strength. Both the flexural strength/MOR and compressive strength at this combination were better than that of Wood Fiber board and Perlite Board. When the usage of starch was reduced from 8 wt. %-to 5 wt. %, both flexural strength and compressive strength of the board were reduced remarkably.

B. Examples of Perlite-Fiber Board of the Second Embodiment without Stucco

Example 1B

Using ingredients listed in TABLE I-B, ½" perlite-fiber board was made in the lab on a TAPPI Former using perlite, corn starch, and paper fiber from corrugated container board. Prescribed amounts of paper fiber (4% pulp) and water were put in a 5-gallon bucket and agitation using a lab mixer at 70 RPM was started. Premixed perlite and starch were then added to the pulp slurry in the bucket and the agitation continued for a total of 60 seconds. When applicable, siloxane emulsion, made using a WARING blender at high speed, was added to the mixture in the bucket 20 seconds before the end of agitation. Whenever siloxane is used, a powder magnesium oxide (MgO) at the MgO/siloxane ratio of 0.5 was also added to the powder mixture of perlite and starch mentioned above. NALCO 7128 flocculent at the concentration of 0.1% and dosage of 0.2 lbs/MSF was added to the mixture 10 seconds before the end of mixing to achieve better retention of the materials and more even distribution of perlite in the final product. At the end of agitation, furnish in the bucket was poured into the TAPPI Former and water is removed to make a 14.75"×14.75" lab board. After vacuuming and pressing, the board was left on bench for 30 minutes for the stucco to set. The set board was then dried in an oven and tested.

TABLE I-B

| TAPPI Boards Made in Example 1 | | |
|---|---|---|
| Samples | A10 | A11 |
| Cellulose fiber percentage, % | 25.0 | 20.0 |
| Perlite percentage, % | 50 | 55 |
| Starch percentage, % | 25 | 25 |
| Siloxane dosage, lbs/MSF | 10.0 | 10.0 |
| MgO/siloxane ratio | 0.5 | 0.5 |
| Board weight, lbs/MSF | 713.3 | 553.1 |
| 4' × 8' wt., lbs | 22.8 | 17.7 |
| Board thickness, in | 0.599 | 0.554 |
| Density, lbs/cu.ft. | 14.3 | 12.0 |
| Flexural peak load, lbf | 45.85 | 27.58 |
| MOR, psi | 320.0 | 224.6 |
| Compressive strength, psi | 124.9 | 90.0 |
| 2 hour water abs. (w/w), % | 14.0 | 15.7 |

TABLE I-B shows the prototype boards A10 and A11 showed good flexural strength (MOR) and compressive strength at 25% starch usage level. Also, it shows increasing cellulose fiber increased flexural strength

Example 2B

This Experiment was carried out to investigate whether good strength can still be achieved at 20% starch usage level. The board weights were also adjusted. Procedures described in Example 1B were followed. The amounts of the ingredients and the results from this investigation are summarized in TABLE II-B.

TABLE II-B

| TAPPI Boards Made in Example 2B | | |
|---|---|---|
| Samples | A21 | A22 |
| Target board wt, lbs/MSF | 650 | 650 |
| Cellulose fiber percentage, % | 25.0 | 30.0 |
| Perlite percentage, % | 55 | 50 |
| Starch percentage, % | 20 | 20 |
| Stucco percentage,% | 0.00 | 0.00 |
| Siloxane dosage, lbs/MSF | 6.0 | 6.0 |
| Actual board wt, lbs/MSF | 647 | 631 |

TABLE II-B-continued

| TAPPI Boards Made in Example 2B | | |
|---|---|---|
| Samples | A21 | A22 |
| 4' × 8' Wt., lbs | 20.7 | 20.2 |
| Board thickness, in | 0.523 | 0.515 |
| Density, lbs/cu.ft. | 14.9 | 14.7 |
| Flexural peak load, lbf | 36.9 | 43.2 |
| MOR, psi | 336.8 | 407.2 |
| Compressive strength, psi | 154.5 | 160.6 |
| 2 hour water absorption, % | 13.0 | 15.2 |

Comparing TABLES I-B and II-B shows even at reduced starch levels increasing cellulose fiber increased flexural strength.

Example 3B

In this example, the amount of starch in each board was increased gradually, but the amounts of other materials in the formulations were kept pretty close. Therefore, the board weight also increased with the increased amount of starch in each board. Procedures described in Example 1B were followed. The amounts of the ingredients and the results from this investigation are summarized in TABLE IIIB. Hygrometric expansion and thermal transmission of the TAPPI boards made in this round of experiment were also measured.

TABLE III-B

| TAPPI Boards Made in Example 3B | | | | |
|---|---|---|---|---|
| | Change starch dosage only | | | |
| Samples | A33 | A34 | A35 | A36 |
| Target Board weight, lb/msf | 550.0 | 585.0 | 620.0 | 650.0 |
| Paper fiber percentage, % | 36.0 | 34.0 | 32.0 | 30.0 |
| Paper fiber wt., g | 3348.5 | 3363.7 | 3355.3 | 3298.0 |
| Perlite percentage, % | 59.0 | 56.0 | 53.0 | 50.0 |
| Perlite wt., g | 247.0 | 249.3 | 250.1 | 247.3 |
| Starch percentage, % | 5.0 | 10.0 | 15.0 | 20.0 |
| Starch wt., g | 20.9 | 44.5 | 70.8 | 98.9 |
| Siloxane dosage, lbs/MSF | 2.0 | 2.0 | 2.0 | 2.0 |
| Board weight, lbs/MSF | 598.8 | 642.9 | 680.8 | 702.7 |
| 4' × 8' wt., lbs | 19.2 | 20.6 | 21.8 | 22.5 |
| Board thickness, in | 0.521 | 0.524 | 0.529 | 0.520 |
| Density, lbs/cuft | 13.8 | 14.7 | 15.5 | 16.2 |
| Flexural peak load, lbf | 18.6 | 31.5 | 41.4 | 49.7 |
| MOR, psi | 171.4 | 287.4 | 370.4 | 459.6 |
| Compressive strength, psi | 114.9 | 151.0 | 180.2 | 200.0 |
| 2 hour water abs., % | 13.5 | 14.6 | 13.8 | 14.6 |
| Hygrometric expansion, in/in.RH | 1.3E−04 | 1.2E−04 | 1.1E−04 | 1.3E−04 |
| Thermal transmission, min:sec | 2:48 | 3:15 | 2:58 | 3:11 |

Both the flexural strength and compressive strength increased significantly with the increased usage of starch in the board. The higher the starch usage, the higher the production cost. For this reason, too much starch is not preferred, even though it can give better strength. The present invention seeks a balance of properties and cost.

Example 4B

Lighter weight perlite-fiber board was made in this round of experiment. Procedures described in Example 1A were followed. The amounts of the ingredients and the results from this investigation are summarized in TABLE IVB.

TABLE IV-B

| TAPPI Boards Made in Example 4B | | | | |
|---|---|---|---|---|
| Samples | A37 | A38 | A39 | A40 |
| Target board wt, lb/msf | 450 | 450 | 450 | 500 |
| Paper fiber percentage, % | 35.0 | 35.0 | 40.0 | 40.0 |
| Perlite percentage, % | 50 | 55 | 50 | 50 |
| Starch percentage, % | 15 | 10 | 10 | 10 |
| Stucco percentage,% | 0 | 0 | 0 | 0 |
| Board weight, lbs/MSF | 459.1 | 455.1 | 456.0 | 507.6 |
| 4' × 8' wt., lbs | 14.7 | 14.6 | 14.6 | 16.2 |
| Board thickness, in | 0.485 | 0.498 | 0.502 | 0.500 |
| Density, lbs/ft3 | 11.36 | 10.97 | 10.90 | 12.20 |
| Flexural peak load, lbf | 17.49 | 14.37 | 19.48 | 21.69 |
| MOR, psi | 185.89 | 144.81 | 193.25 | 217.33 |
| Compressive, psi | 73.2 | 75.9 | 65.5 | 99.3 |

It can be seen in TABLE IV-B that at light board weight, both the flexural strength/MOR and compressive strength of the boards were still good.

C. Examples Comparing OCC and Newsprint

Example 1C

Applicants did fiber analysis on both OCC and Newsprint pulps using a Fiber Quality Analyzer made by OpTest Equipment Inc. The result are shown in TABLE V-A:

TABLE V-A

| Fibers | OCC | Newsprint |
|---|---|---|
| Mean Length, mm | 0.533 | 0.482 |
| Length Weighted Length, mm | 1.427 | 1.366 |
| Fiber Width, um | 22.54 | 24.09 |
| Mean Curl | 0.097 | 0.090 |
| Mean Curl LW | 0.119 | 0.095 |

As discussed earlier, Applicants believe OCC with relatively longer fibers will perform better than Newsprint with relatively shorter fibers. To test this ½ inch stucco-containing and stucco less Entry Level Roof boards were made in lab on a Tappi Former using OCC and Newsprint fibers respectively of TABLE V-A following the procedures specified in Example 2A and Example 1B.

The testing results of the boards are shown in TABLE V-B. It can be seen in the TABLE V-B that for both stucco containing and stucco less boards, significantly higher MORs were achieved when longer fibered OCC was used in the formulation.

TABLE V-B

| Sample description | OCC-with stucco | Newsprint-with stucco | OCC-no stucco | Newsprint-no stucco |
|---|---|---|---|---|
| Paper fiber used | OCC | News | OCC | News |
| Paper fiber percentage, % | 25.0 | 25.0 | 40.0 | 40.0 |
| Perlite percentage, % | 27.5 | 27.5 | 50 | 50 |
| Starch percentage, % | 10 | 10 | 10 | 10 |
| Stucco percentage,% | 37.5 | 37.5 | 0.0 | 0.0 |
| Board wt, lbs/MSF | 664.7 | 646.6 | 590.9 | 586.8 |
| 4' × 8' wt., lbs | 21.3 | 20.7 | 18.9 | 18.8 |
| Board thickness, in | 0.436 | 0.438 | 0.458 | 0.455 |
| Density, lbs/ft3 | 18.29 | 17.71 | 15.48 | 15.48 |
| MOR, psi | 229.28 | 190.17 | 195.805 | 170.69 |

Example 1D

The inventors furthermore discovered using longer OCC or DLK fiber will not only result in better final product strength, but also higher green strength. Green strength is the strength before the board is being dried in kiln and the board is still wet (also called wet strength sometimes). At this moment in processing, the starch in the board has not been cooked and therefore provides little binding force. Board with weak green strength may break during transition from former to kiln and inside the kiln during drying. This unlikely to be a problem with stucco containing panel because the stucco will set when the panel is still set and provide enough strength.

The inventors tested whether the use of OCC, instead of Newsprint, will be able to achieve better green strength for stucco less board. In this test, ½ inch stucco less Entry Level Roof boards were made in lab on a Tappi Former using OCC and Newsprint fibers respectively of TABLE V-A following the procedures specified in Example 1B. After the board was formed, vacuumed and pressed, four pieces of 3"×5" samples were cut off from the green board using a band saw. The tensile strength of the samples was then tested on an INSTRON machine at 15 psi the clamp pressure, 2 inch distance, 8 in/min speed, and 5 mm/s$^2$ acceleration. The results are expressed as the maximum load and given in the TABLE V-C.

TABLE V-C

| Paper fiber used | OCC | Newsprint |
|---|---|---|
| Paper fiber percentage, % | 40.0 | 40.0 |
| Perlite percentage, % | 50 | 50 |
| Starch percentage, % | 10 | 10 |
| Stucco percentage, % | 0.0 | 0.0 |
| Green strength, lb-f | 7.01 | 4.94 |

TABLE V-C shows the green strength of the wet board made with OCC is remarkably better than that made with Newsprint.

Although we have described the preferred embodiments for implementing our invention, it will be understood by those skilled in the art to which this disclosure is directed that modifications and additions may be made to our invention without departing from its scope.

We claim:

1. A roof cover board made from a mixture of, on a water free basis, in wt. %:

30-45% stucco (calcium sulfate hemihydrate);
20-50% perlite;
15-30% cellulose fiber;
8-20% starch; and
0.2 to 2% siloxane.

2. The board of claim 1, wherein the mixture comprises:

40-45% stucco;
20-35% perlite;
20-30% cellulose fiber;
8-15% starch; and
0.2 to 2% siloxane.

3. The board of claim 2, wherein the perlite comprises particles of expanded perlite, wherein the cellulose fiber comprises recycled cellulose fiber, and wherein the starch is corn starch, wherein the recycled cellulose fiber comprises corrugated container board (OCC) or double lined kraft (DLK), and the expanded perlite has a density between 2 and 20 lbs/ft$^3$, wherein the cellulose fibers have a weighted average fiber length of greater than 3.5 mm to at most 6 mm.

4. The board of claim 1, wherein the board has an absence of bituminous material, wherein the mixture has 0.2 to 2% siloxane, wherein the stucco is the largest single component by dry weight, and wherein the board has 0 to 0.4 wt. % additional optional ingredients.

5. The board of claim 1, wherein the mixture has 0.2 to 2% siloxane further comprising a catalyst selected from the group consisting of an alkaline earth oxide, an alkaline hydroxide, and any combination thereof, and the siloxane catalyst is present in a ratio of catalyst-to-siloxane of 0.5.

6. The board of claim 1, wherein the mixture contains 40-45% stucco,
20-35% perlite,
20-30% cellulose fiber,
8-15% starch, and
0.4 to 1% siloxane.

7. The board of claim 1, wherein the siloxane is methyl hydrogen siloxane, wherein the perlite comprises particles of expanded perlite, wherein the cellulose fiber comprises recycled cellulose fiber, and wherein the starch is corn starch.

8. The board of claim 1, wherein the perlite comprises particles of expanded perlite, wherein the cellulose fiber comprises recycled cellulose fiber, and wherein the starch is corn starch, wherein the mixture comprises 40-45% stucco.

9. The board of claim 1, wherein the board has a thickness of 0.25-1 inch, weight of 500-900 lbs/MSF, a density between 12 and 22 lbs/ft$^3$, a MOR of at least 150 psi, and a compressive strength of at least 100 psi.

10. The board of claim 1, wherein the board has an absence of newsprint and the cellulose fibers have a weighted average fiber length of greater than 1.4 mm.

11. A method of manufacturing the roof cover board of claim 1, the method comprising:

mixing a composition containing:
stucco,
perlite,
cellulose fiber,
starch,
siloxane, and
water
to form a slurry furnish with a consistency of 5-15%,
the composition in wt. % on a water free basis being a mixture of:
30-45% stucco,
20-50% perlite,
15-30% cellulose fiber,
8-20% starch,
0.2 to 2% siloxane, and
depositing the slurry furnish onto a moving wire;
dewatering the slurry furnish to form a pad;
optionally, pressing the pad to further remove water and to achieve a desired thickness and surface smoothness;
cutting the pad to form uncured roof cover boards;
allowing the uncured boards to set; and
drying the set boards in a kiln.

12. A roof cover board made from a mixture of, on a water free basis, in wt. %:

30-60% perlite,
30-60% recycled cellulose fiber,
5-25% starch, and
0.2 to 2% siloxane;
having an absence of stucco,
having an absence of bituminous material,
having an absence of newsprint, and
containing less than 5% polymer; and
the board having a weight between 450 and 600 lbs/MSF and a density of between 11 and 14 lbs/ft$^3$.

13. The board of claim 12, wherein the recycled fiber is recycled cellulose fiber, and wherein the mixture contains 45-55% perlite,
35-45% recycled cellulose fiber,
8-12% starch, and
0.2 to 2% siloxane.

14. The board of claim 12, wherein the perlite comprises particles of expanded perlite and wherein the starch is corn starch.

15. The board of claim 14, wherein the recycled cellulose fiber comprises corrugated container board (OCC) or double lined kraft (DLK), and the expanded perlite has a density between 2 and 20 lbs/ft$^3$.

16. The board of claim 12, further comprising a catalyst, wherein the siloxane is methyl hydrogen siloxane for use as a water repellant and the catalyst is magnesium oxide.

17. The board of claim 12, having a thickness of 0.25-1 inch, having a MOR of at least 150 psi, and a compressive strength of at least 90 psi.

18. The board of claim 12, wherein the recycled cellulose fibers have a weighted average fiber length of greater than 1.4 mm.

19. A method of manufacturing the roof cover board, using a wet forming process comprising:

mixing a composition containing:
perlite,
recycled cellulose fiber,
starch,
siloxane, and
water
to form a furnish with a consistency of 3-10%;
the composition in wt. % on a water free basis being a mixture of:
30-60% perlite,
30-60% recycled cellulose fiber,
5-25% starch, and
0.2 to 2% siloxane,
having an absence of stucco,
having an absence of bituminous material,
having an absence of newsprint, and
containing less than 5% polymer;
dewatering the furnish on a moving wire to form a pad;
optionally, pressing the pad to further remove water and achieve desired thickness and surface smoothness,
cutting the pad to form green board; and
drying the green board in a kiln, the dried board having a weight between 400 and 685 lbs/MSF, and a density of between 10 and 17 lbs/ft$^3$.

20. A roof cover board made from a mixture of, on a water free basis, in wt. %:

45-55% perlite,
35-45% recycled cellulose fiber,
8-12% starch, and
0.2 to 2% siloxane;
having an absence of stucco,
having an absence of bituminous material,
having an absence of newsprint, and
containing less than 5% polymer; and
the board having a weight between 400 and 685 lbs/MSF and a density of between 10 and 17 lbs/ft$^3$.

* * * * *